United States Patent
Bardon et al.

(10) Patent No.: US 7,900,508 B2
(45) Date of Patent: Mar. 8, 2011

(54) METHODS FOR CONTROLLING AND MAKING PARTICLE FILTERING DEVICES

(75) Inventors: Sebastien Bardon, Paris (FR); Vincent Marc Gleize, Avignon (FR); Patrick Jacques Dominique Girot, Salon de Provence (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 354 days.

(21) Appl. No.: 12/067,658

(22) PCT Filed: Sep. 19, 2006

(86) PCT No.: PCT/FR2006/050908
§ 371 (c)(1),
(2), (4) Date: Sep. 26, 2008

(87) PCT Pub. No.: WO2007/034111
PCT Pub. Date: Mar. 29, 2007

(65) Prior Publication Data
US 2009/0217762 A1  Sep. 3, 2009

(30) Foreign Application Priority Data
Sep. 23, 2005  (FR) ...................................... 05 52840

(51) Int. Cl.
*G01M 15/10*  (2006.01)
(52) U.S. Cl. ..................................................... 73/114.69
(58) Field of Classification Search ............... 73/114.69, 73/114.71, 114.75, 114.76
See application file for complete search history.

(56) References Cited

U.S. PATENT DOCUMENTS

| 6,035,715 A | 3/2000 | Porter |
| 6,298,729 B1 | 10/2001 | Locker et al. |
| 2010/0037684 A1* | 2/2010 | Harshbarger et al. ...... 73/114.76 |

FOREIGN PATENT DOCUMENTS

| DE | 102 26 439 A1 | 12/2003 |
| EP | 1 369 161 A1 | 12/2003 |

* cited by examiner

*Primary Examiner* — Eric S McCall
(74) *Attorney, Agent, or Firm* — Oblon, Spivak, McClelland, Maier & Neustadt, L.L.P.

(57) ABSTRACT

One subject of the invention is a process for checking the robustness of a particulate filter intended to be used in the exhaust line of a diesel engine, comprising the steps consisting in, having first determined the soot mass limit of the filter, loading a new filter with a level of soot at least equal to two times and at most equal to three times the soot mass limit, then making the filter undergo a severe regeneration then, in any order, determining the filtration efficiency of the filter, measuring its pressure drop and comparing it to the pressure drop of the new filter, measuring its level of cracking, and finally checking its integrity after a mechanical stress. Another subject of the invention is a method for diagnosing the robustness of a filter.

10 Claims, No Drawings

METHODS FOR CONTROLLING AND MAKING PARTICLE FILTERING DEVICES

The present invention relates to the field of particulate filters used in an exhaust line of a diesel engine for removing soot produced by the combustion of the fuel. The invention more particularly relates to a process for controlling and diagnosing the thermomechanical properties of such a filter and also to a process for manufacturing particulate filters.

Diesel engines are known for producing a large amount of soot. This results from hydrocarbon pyrolysis in the absence of oxygen at the very heart of the combustion flame and insufficient temperature within the combustion chamber to burn all of the soot particles thus produced. This soot, when it is emitted outside of the vehicle, acts as a seed on which the unburnt hydrocarbons condense, thus constituting solid particulates which may be inhaled and whose small size allows them to progress right into the pulmonary alveoli.

To limit the emission of soot outside of the vehicle and to meet the increasingly severe environmental standards, it is known to provide, in the exhaust line, filtration devices, optionally combined with catalytic devices, the latter having the objective of converting polluting gaseous emissions into inert gases. Appearing in the polluting gaseous emissions are, in particular, unburnt hydrocarbons and also nitrogen oxides ($NO_x$) or carbon monoxide (CO).

The soot filtration devices, commonly called "particulate filters" are generally composed of a porous ceramic filtering support. This support generally has a honeycomb structure, one of the faces of said structure allowing the entry of the exhaust gases to be filtered and the other face the exit of the filtered exhaust gases. Between these faces, the filtering structure has an assembly of longitudinal and parallel channels separated from one another by porous walls, said channels being closed off at one of their ends in order to force the exhaust gases to pass through said porous walls. For good sealing of the assembly, the peripheral part of the structure is surrounded by a cement known as a coating cement. The filter is also surrounded by a protective coating, which is frequently called a "canning" and is formed from a glass fiber mat and from a metal jacket. In order to impart a better thermal shock resistance, the filters are sometimes composed of an assembly of parallelepipedal monolithic elements having a honeycomb structure, said elements being assembled using a cement.

The ceramics usually used are cordierite ($Mg_2Al_4Si_2O_{18}$) or silicon carbide (SiC), the latter being preferred for its thermal conductivity and corrosion resistance properties.

During operation of the engine, the particulate filter is loaded with soot particles, which are deposited on the porous walls. In the same manner as in the combustion chamber, the problem of the minimum temperature required to allow the combustion of the soot exists. Since the soot is retained in the filter, the combustion kinetics may be slower than in the combustion chamber, which makes it possible to lower the combustion temperature of the soot to around 600° C. This gain is however insufficient to ensure combustion of the soot within the filter over the entire operating range of the engine. It is therefore necessary to provide, following a filtration cycle, a regeneration cycle during which the soot is burnt.

The particulate filter therefore functions according to the following methods:
- quasi-simultaneous filtration and combustion of the soot when the temperature of the exhaust gases allows it;
- retention and accumulation of the soot particles in the filter when the temperature of the exhaust gases is too low; and
- regeneration of the filter before the pressure drops due to the accumulation of the soot become unacceptable.

The gradual clogging of the filter during the soot retention phase specifically causes an increase in the pressure drop that is expressed by an increase in the fuel consumption of the engine.

The regeneration step is carried out by raising the temperature of the exhaust gases using a post-injection, which consists in injecting fuel late in the engine cycle, which fuel will burn in the exhaust line.

During the regeneration, and because of the exothermic combustion of the soot, the filter is subjected to temperatures that are high, and moreover inhomogeneous, within the material as the soot particles are preferably deposited in the central part of the filter and also in its downstream part. The filter is therefore subjected to a high thermal shock, capable of generating microcracks within the material which lead to a partial or total loss of its filtration ability.

It appears important to be able to predict and control the performances of a given filter in terms of thermomechanical strength in order to endure its robustness.

The term "robustness" is understood, within the meaning of the present invention, to mean the ability of a filter to maintain, without immediate intervention, an acceptable operating level under customary driving conditions, especially the type comprising driving 60% of the time on freeways, 15% of the time in towns and cities and 25% on highways.

One commonly used parameter known as "soot mass limit" consists in determining the soot content accumulated in the filter starting from which a so-called severe regeneration cycle generates cracks. The severe regeneration is characterized by the engine changing to idling speed (typically to a speed of 800 rpm) when the regeneration is already underway. This has the effect of speeding up the combustion of the soot by a massive supply of oxygen for a low exhaust gas flow rate. The soot mass limit being thus determined, it is then a question for the car manufacturer to adapt the frequency of the regenerations in order that the latter only take place for accumulated soot masses below this mass limit. Systems for estimating in-line the mass of soot accumulated in the filter have been developed, and are generally based on a measurement of the pressure drop, that is to say on the differential pressure between the upstream and downstream of the filter.

The inventors have however demonstrated that this parameter is insufficient in terms of predicting the robustness and that it is especially impossible to ensure, during the subsequent operation of the filter, that all of the regenerations will be carried out below the soot mass limit. It was apparent to the inventors that various factors were capable of having the result that regenerations occur for soot masses substantially higher than the soot mass limit, in particular of around two times this mass limit. This may, in particular, be a question of a poor correlation between the pressure drop measured and the soot mass actually accumulated, or else an underestimate of the amount of soot emitted outside of the combustion chamber, in particular when driving in an urban environment or in the case of a technical problem of the engine (linked, for example, to a high oil consumption). One solution to this problem would be to increase the frequency of the regenerations, which would however have the drawback of increasing the fuel consumption.

Therefore, there remains a need to be able to check and diagnose the robustness of particulate filters and to be able to choose the filter materials and structures that allow this robustness to be guaranteed.

For this purpose, a first subject of the invention is a process for checking the robustness of a particulate filter intended to be used in the exhaust line of a diesel engine, comprising the steps consisting in:

having first determined the soot mass limit of said filter, loading a new filter with a level of soot at least equal to two times and at most equal to three times said soot mass limit, then making said filter undergo a severe regeneration then, in any order:

determining the filtration efficiency of said filter;

measuring its pressure drop and comparing it to the pressure drop of the new filter;

measuring its level of cracking; and finally checking its integrity after a mechanical stress.

Another subject of the invention is a method for diagnosing the robustness of a particulate filter intended to be used in the exhaust line of a diesel engine, comprising the steps consisting in implementing the checking process according to the invention and in diagnosing that a filter is robust by comparing the filtration efficiency, the variation in pressure drop, the level of cracking and the integrity of said filter to a predetermined value and/or to a predetermined level.

It is apparent to the inventors that this way of proceeding makes it possible to ensure, with a high degree of certainty, the robustness or of the absence of robustness of a particulate filter, and to do so for a lower cost, the set of tests carried out constituting a set that is necessary and sufficient to achieve this objective.

The determination of the soot mass limit preferably comprises the steps consisting in loading a population of at least ten filters with different soot masses, in making each of said filters undergo a severe regeneration, then in determining the soot mass for which cracks, visible to the naked eye, appear.

The severe regeneration preferably comprises an initiation of the combustion of the soot then changing of the engine to idling speed. The severe regeneration steps are advantageously carried out in the same manner when it is a question of determining the soot mass limit of one type of filter and when it is a question of regenerating a filter loaded with soot before making it undergo the set of tests according to the invention.

The new filter is preferably loaded with a soot level of around two and a half times its soot mass limit before undergoing the severe regeneration.

The filtration efficiency of the filter is advantageously determined by measuring the amount of smoke emitted at the outlet of the filter relative to the amount at the inlet. In order to do this, it is possible to place a smoke meter upstream and downstream of the particulate filter, the latter being positioned in an exhaust line of a diesel engine. The smoke meter makes it possible to determine the amount of soot particles emitted by a measurement of the blackening due to the smoke. During the measurement, the engine is preferably placed at its operating point corresponding to its maximum power.

The expression "pressure drop" is understood within the meaning of the present invention to mean the differential pressure between the upstream and downstream of the filter. The pressure drop must be measured according to the same protocol for the new filter and the regenerated filter. Various methods exist, which are well known to a person skilled in the art.

The degree of cracking of the filter is preferably measured using a non-destructive type process, especially with the aid of the process described in Patent Application FR-A-2 840 405, and in particular by measuring the propagation of ultrasonic waves through the filter. Among the propagation parameters (propagation speed, frequency and amplitude of the waves), the speed has proved to be a reliable indicator of the amount and severity of the cracks. Too large a decrease in the propagation speed relative to the propagation speed of ultrasonic waves through the new material may specifically be perfectly correlated with the presence of cracks. Measurement of the degree of cracking is therefore preferably carried out by comparison between the measurement of the propagation speed of ultrasonic waves through the filter and the equivalent measurement through the new filter.

The mechanical integrity of the filter is preferably checked by verifying that the components of the filter remain firmly attached after the filter has been subjected to vibrations, in particular vibrations representative of those undergone by a filter in an exhaust line of an engine. The term "components" is understood here to mean the fibrous mat surrounding the filter and also the parallelepipedal monolithic elements assembled together by a cement in the case of an assembled filter. Insufficient mechanical integrity may be manifested by a disassociation of the fibrous mat and of the filter, or else by a disassociation of one or more monolithic elements of an assembled filter.

For reasons of operating ease, the test is preferably carried out at ambient temperature. It may sometimes be carried out at a higher temperature. The vibrations undergone are advantageously characterized by frequencies between 50 and 250 Hz and a duration of at least 15 minutes for an acceleration of 30 g.

More specifically, within the meaning of the present invention, the following indices are defined:

the filtration efficiency index;

the pressure drop index;

the cracking index; and the integrity index.

These indices are measured by, having previously determined the soot mass limit and carried out the severe regeneration on a filter loaded with two and a half times this soot mass limit, following the protocol defined hereinbelow.

The determination of the soot mass limit and the severe regeneration are carried out on an engine test bench equipped with a device for measuring the pressure drop. The engine used is an engine of the DW10A type manufactured by PSA. It is a direct-injection diesel engine having a 2 l displacement. This engine is supplied with a fuel whose sulfur content is below 350 ppm and that contains a cerium oxide content of 25 ppm, the latter being an additive commonly used to reduce the soot combustion temperature. The particulate filter is mounted with its protective covering downstream of the engine and of an oxidation catalyst.

A new filter population of at least ten filters is successively subjected to the following steps.

The engine is run at full power at 4000 rpm for 30 minutes in order to thermally stabilize the filters mounted as described previously, that is to say with their protective coating. The filters are then disassembled and weighed with their protective coating to determine an initial mass. The filters are then remounted in the exhaust line then subjected, for different durations, to operation of the engine at 3000 rpm for a torque of 50 Nm in order to be loaded with various soot masses. The filters then being weighed, the mass of soot is determined for each filter from the difference between the mass obtained and the initial mass.

The filters thus loaded are remounted in the line to undergo a severe regeneration defined thus: after a stabilization at an engine speed of 1700 rpm for a torque of 95 Nm for 2 minutes, a post-injection is carried out with 70° phasing for a post-injection flow rate of 18 mm$^3$/shot. Once the soot combustion is initiated, more precisely when the pressure drop decreases for at least 4 seconds, the engine speed is reduced to 1050 rpm for a torque of 40 Nm for 5 minutes in order to accelerate the soot combustion. The filter is then subjected to an engine speed of 4000 rpm for 30 minutes in order to eliminate the remaining soot.

The filters thus regenerated are inspected after cutting up to reveal the possible presence of cracks visible to the naked eye. The soot mass limit corresponds to the mass of soot for which these cracks appear.

The checking process is then carried out on an identical new filter of the same nature as the filters thus tested.

The pressure drop of the new filter (without soot) is measured for an air flow rate greater than 100 m$^3$/h. The propagation speed of the ultrasound is also measured at a frequency typically of 50 kHz. The equipment used may be, for example, that sold by CNS Farnell under the name "Pundit plus".

The filter is then loaded with soot as defined previously to a content equal to two and a half times its soot mass limit, then regenerated, also according to the protocol described previously.

The filtration efficiency index is defined as the difference between the amount of soot particles upstream of the filter and the amount of soot particles downstream of said filter relative to the amount of soot particles upstream of said filter.

In order to do this, a smoke meter is placed upstream and downstream of the particulate filter, the latter being placed in the exhaust line of the engine running at full power at 4000 rpm for 30 minutes.

The inventors have demonstrated that a robust filter must have, under, these measurement conditions, a filtration efficiency index greater than or equal to 85%.

Next, the pressure drop of the regenerated filter is measured by following the same operating protocol as for the new filter and the pressure drop index is defined as being the percentage of variation in the pressure drop of the regenerated filter relative to the pressure drop of the new filter. This index may be positive or negative, the latter situation generally arising due to the appearance of cracks.

A robust filter must have a pressure drop index less than or equal to 10% in absolute value.

The cracking index corresponds to the percentage variation between the propagation speed of ultrasonic waves through the regenerated filter according to the invention and the propagation speed of ultrasonic waves through the new filter, the two measurements being carried out according to the same operating protocol. This index is, as a general rule, negative.

A robust filter must have a cracking index greater than or equal to −30%.

The filter is then subjected to the integrity test.

The filter is placed in its protective coating on an electrodynamic test bench equipped with accelerometers placed at various locations. A first accelerometer is placed in contact with the filter in the center of one of its planar faces, a second accelerometer being placed on the metal jacket of the protective coating. These two at least biaxial accelerometers make it possible to measure the vibration in the direction of the axis of the filter and also the radial vibrations and an optional decoupling between the filter and its protective coating and to make it possible to control the stability of the attachment of the protectively-coated filter to the electrodynamic bench.

The regenerated filter is subjected to a vibration cycle at a frequency of 185 Hz comprising successive holds of 15 minutes each corresponding to a given acceleration. The first hold corresponds to an acceleration of 5 g, the second to an acceleration of 10 g, the acceleration then being increased by steps of 10 g for each successive hold.

This vibration test may be carried out on an electrodynamic test bench sold by LDS Test and Measurement LLC, having a 35 kN capacity and equipped with a hydraulic jack having a maximum force of 10 kN, operating in the frequency range of 0-500 Hz and equipped with a 200 bar hydraulic control unit having a flow rate of 21 l/min.

The integrity index is defined by the number of components dissociated from the filter at the end of the test. A robust filter necessarily has a zero integrity index.

Another subject of the invention is a method for diagnosing the robustness of a particulate filter intended to be used in the exhaust line of a diesel engine, comprising the steps consisting in determining its filtration efficiency index, its pressure drop index, its cracking index and its integrity index, insofar as they were defined above, and in diagnosing that a filter is robust when it has a filtration efficiency index greater than or equal to 85%, a pressure drop index less than or equal to 10% in absolute value, a cracking index greater than or equal to −30% and a zero integrity index.

A final subject of the invention is a process for manufacturing particulate filters intended to be used in the exhaust line of a diesel engine comprising a step of shaping a mixture of mineral and optionally organic raw materials defined by their chemical nature and/or their particle size, then drying and firing according to certain parameters, it moreover comprises the following steps:
  for each combination of raw material chemical nature and particle size and/or shaping, drying and firing parameters, the diagnostic method according to the invention is implemented;
  a combination is chosen that makes it possible to obtain a robust particulate filter; then
  the chosen combination is used to produce the particulate filters.

The mineral raw materials used are defined by their chemical nature and their particle size or particle size distribution. These two parameters will play a large part in the robustness and the thermomechanical properties of the filter, especially through the overriding influence that they will have on the chemical nature and the structure of the material obtained, in particular on the porosity of the material (pore size distribution, pore distribution homogeneity), the chemical nature of the grains and grain boundaries, etc.

Organic materials are frequently added, which make it possible to adjust the viscosity and the plasticity of the mixture before shaping.

The shaping parameters and the type of shaping will also influence the structure of the material obtained. Thus, during shaping by extrusion to obtain a honeycomb structure, the shape of the die will, for example, directly influence the thickness of the walls or the channel density.

The drying and firing parameters, in particular the time/temperature cycles, also have an impact on the structure of the material and on its nature, the firing possibly, for example, causing a chemical or crystallographic modification of the mineral raw materials used or a densification of the material.

The invention will be better understood through the detailed description of the following exemplary embodiment.

A recrystallized silicon carbide (R—SiC) filter composed of an assembly of parallelepipedal monolithic elements having a honeycomb structure was obtained according to the following process: said elements were extruded then fired at more than 2000° C. and finally assembled using a cement based on silicon carbide. The structure obtained was then machined in order to give it a cylindrical shape with a circular base, then coated with a cement. The filter thus produced had a diameter of 14.38 cm and a length of 25.4 cm. The channel density of the monolithic elements was 31 channels per cm². The manufacture of such filters is, for example, described in Patent Application EP-A-816 065 or EP-A-1 142 619.

In order to determine its filtration efficiency, pressure drop, cracking and integrity indices, the soot mass limit of this type of filter was measured according to the protocol defined above using 12 filters of the same nature. The soot mass limit obtained was 7 g/l, that is to say 7 grams per liter of filter.

A new filter was then characterized using the control process according to the invention. The pressure drop of the new filter was 16.1 mbar.

The filter was then loaded with soot in such a way that its soot mass was 18 grams, or around two and a half times its soot mass limit. It then underwent a severe regeneration according to the previously described procedure, then was subjected to the tests according to the invention. Its filtration efficiency index was 88%, which means that 88% of the soot was filtered. The pressure drop of the regenerated filter was 16.3 mbar, namely an increase of only 1.2%, this value corresponding to the pressure drop index. The propagation speed of ultrasonic waves decreased by 23% relative to the propagation speed through the new filter, which made it possible to determine a cracking index equal to −23%, therefore greater than −30%. The integrity index was itself zero, no element of the filter being disassociated after the vibration test.

A new filter identical to the filter tested was subjected to driving conditions comprising driving for 60% of the time on a freeway, 15% in towns and cities and 25% of the time on a highway for 120 000 km and an acceptable operation of the filter was able to be maintained.

The control and diagnostic process according to the invention may be applied to the control of the quality both of a new filter and of a restored filter. The expression "restored filter" is understood to mean a filter that has been cleaned after operating in the exhaust line of an engine.

The process according to the invention is also perfectly suitable for the statistical control of a production of filters or for the selection of robust filters in the context of the development of novel materials or manufacturing processes.

The aforegoing description makes it possible to illustrate some possible embodiments of the invention. It is clearly understood that this description is not however limiting and that a person skilled in the art is able to carry out other variants of the invention without however going outside its scope.

The invention claimed is:

1. A process for checking the robustness of a particulate filter intended to be used in the exhaust line of a diesel engine, comprising the steps of:
    determining first the soot mass limit of said filter, loading a new filter with a level of soot at least equal to two times and at most equal to three times said soot mass limit, then making said filter undergo a severe regeneration and then, in any order:
    determining the filtration efficiency of said filter;
    measuring its pressure drop and comparing it to the pressure drop of the new filter;
    measuring its level of cracking; and finally
    checking its integrity after a mechanical stress.

2. The process as claimed in claim 1, wherein the new filter is loaded with a level of soot of around two and a half times its soot mass limit.

3. The process as claimed in claim 1, wherein the determination of the soot mass limit comprises the steps of loading a population of at least ten filters with different soot masses, making each of said filters undergo a severe regeneration, then determining the soot mass for which cracks, visible to the naked eye, appear.

4. The process as claimed in claim 1, wherein the severe regeneration comprises an initiation of the combustion of the soot then a changing of the engine to idling speed.

5. The process as claimed in claim 1, wherein the filtration efficiency of the filter is determined by measuring the amount of smoke emitted at the outlet of the filter relative to the amount at the inlet, said filter being placed in an exhaust line of a diesel engine placed at its operating point corresponding to its maximum power.

6. The process as claimed in claim 1, wherein the step of measuring the level of cracking is carried out by comparison between the measurement of the propagation of ultrasonic waves through the filter and the equivalent measurement through the new filter.

7. The process as claimed in claim 1, wherein the mechanical integrity of the filter is checked by verifying that the components of the filter remain firmly attached after the filter has been subjected to vibrations.

8. A method for diagnosing the robustness of a particulate filter intended to be used in the exhaust line of a diesel engine, comprising the steps of implementing the control process as claimed in claim 1 and diagnosing that a filter is robust by comparing the filtration efficiency, the variation in pressure drop, the level of cracking and the integrity of said filter to predetermined values and/or to a predetermined level.

9. The diagnostic method as claimed in claim 8, wherein a filter is diagnosed as robust when it has a filtration efficiency index greater than or equal to 85%, a pressure drop index less than or equal to 10% in absolute value, a cracking index greater than or equal to −30% and a zero integrity index.

10. A process for manufacturing particulate filters intended to be used in the exhaust line of a diesel engine comprising a step of shaping a mixture of mineral and optionally organic raw materials defined by their chemical nature and/or their particle size, then drying and firing according to certain parameters, characterized in that said process additionally comprises the following steps:
    for each combination of raw material chemical nature and particle size and/or shaping, drying and firing parameters, the diagnostic method as claimed in claim 8 is implemented;
    a combination is chosen that makes it possible to obtain a robust particulate filter; then
    the chosen combination is used to produce said particulate filters.

* * * * *